(12) United States Patent
Park et al.

(10) Patent No.: US 9,944,403 B2
(45) Date of Patent: Apr. 17, 2018

(54) LIQUID STORAGE SYSTEM

(71) Applicant: BAE Systems plc, London (GB)

(72) Inventors: Nicholas Park, South Gloucestershire (GB); Simon Anthony Jenkins, South Gloucestershire (GB); Andrew James Irwin, South Gloucestershire (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/307,857

(22) PCT Filed: May 6, 2015

(86) PCT No.: PCT/GB2015/051324
§ 371 (c)(1),
(2) Date: Oct. 31, 2016

(87) PCT Pub. No.: WO2015/170091
PCT Pub. Date: Nov. 12, 2015

(65) Prior Publication Data
US 2017/0057653 A1 Mar. 2, 2017

(30) Foreign Application Priority Data

May 7, 2014 (EP) .................................. 14275103
May 7, 2014 (GB) .................................. 1408015.4

(51) Int. Cl.
*B64D 37/04* (2006.01)
*B64D 37/32* (2006.01)
(Continued)

(52) U.S. Cl.
CPC .............. *B64D 37/32* (2013.01); *B60K 15/03* (2013.01); *B64D 37/06* (2013.01); *B64D 37/08* (2013.01);
(Continued)

(58) Field of Classification Search
CPC .......................... B64D 2037/325; B64C 3/34
(Continued)

(56) References Cited

U.S. PATENT DOCUMENTS 1,874,685 A 8/1932 Wright
2,343,005 A 2/1944 Gardner
(Continued)

FOREIGN PATENT DOCUMENTS

DE 19749950 A1 5/1999
DE 10218144 A1 11/2003
(Continued)

OTHER PUBLICATIONS

Characteristics of Kyocera Technical Ceramics, Jun. 30, 2004, XP055149244, Retrieved Oct. 28, 2014 from url: http://americas.kyocera.com/kicc/pdf/kyocera_Material_Characteristics.pdf.
(Continued)

*Primary Examiner* — J. Gregory Pickett
*Assistant Examiner* — Allan Stevens
(74) *Attorney, Agent, or Firm* — Maine Cernota & Rardin

(57) ABSTRACT

A liquid storage system comprising: a tank for containing a liquid, the tank enclosing a liquid storage space; multiple layers of a fabric material; and attachment means attaching the multiple layers of the fabric material to an internal surface of the tank. The attachment means may comprise a non-permeable envelope attached to the internal surface of the tank. The multiple layers of the fabric material may be enclosed in the envelope such that the multiple layers of a fabric are isolated from a fluid in the tank. The envelope may contain a fluid (e.g. air) in addition to the multiple layers of the fabric material.

12 Claims, 4 Drawing Sheets

(51) Int. Cl.
  *B64D 37/06* (2006.01)
  *B64D 37/08* (2006.01)
  *F41H 5/04* (2006.01)
  *B60K 15/03* (2006.01)

(52) U.S. Cl.
  CPC .. *F41H 5/0485* (2013.01); *B60K 2015/03407* (2013.01); *B60Y 2200/51* (2013.01); *B64D 2037/325* (2013.01)

(58) Field of Classification Search
  USPC .... 220/560.01, 560.11, 560.02, 560.03, 562, 220/563, 564; 89/36.08, 36.11, 914, 915, 89/916, 937
  See application file for complete search history.

(56) References Cited

U.S. PATENT DOCUMENTS

| | | | |
|---|---|---|---|
| 2,354,701 A | 8/1944 | Pescara | |
| 2,519,393 A | 8/1950 | Noyes | |
| 2,754,992 A | 7/1956 | Wilson | |
| 3,004,509 A | 10/1961 | Rene Leroux | |
| 3,420,477 A | 1/1969 | Durrell | |
| 3,616,189 A | 10/1971 | Harr | |
| 3,969,563 A * | 7/1976 | Hollis, Sr. | B32B 3/28 220/62.11 |
| 4,336,291 A | 6/1982 | Broadhurst | |
| 4,360,124 A | 11/1982 | Knaus | |
| 4,469,295 A | 9/1984 | Schuster | |
| 4,828,206 A | 5/1989 | Bruno | |
| 4,925,057 A | 5/1990 | Childress | |
| 5,195,650 A | 3/1993 | Leidig | |
| 5,451,015 A | 9/1995 | Cronkhite | |
| 5,647,503 A | 7/1997 | Steele | |
| 5,674,586 A | 10/1997 | Toni | |
| 5,738,925 A | 4/1998 | Chaput | |
| 6,220,287 B1 | 4/2001 | Wolf | |
| 7,861,884 B2 | 1/2011 | Childress | |
| 8,096,223 B1 | 1/2012 | Andrews | |
| 9,266,619 B2 | 2/2016 | Childress | |
| 2002/0047015 A1 | 4/2002 | Distelhoff | |
| 2005/0085146 A1 | 4/2005 | Farkas | |
| 2006/0174417 A1 | 8/2006 | Elrod | |
| 2007/0017359 A1 | 1/2007 | Gamache | |
| 2008/0148929 A1 * | 6/2008 | Graphenius | F41H 1/02 89/36.02 |
| 2009/0090236 A1 | 4/2009 | Misencik | |
| 2009/0152278 A1 | 6/2009 | Lindner | |
| 2009/0236163 A1 | 9/2009 | Wibbeke et al. | |
| 2011/0017748 A1 | 1/2011 | Palma | |
| 2011/0094598 A1 | 4/2011 | Childress et al. | |
| 2011/0168728 A1 | 7/2011 | McDermott | |
| 2012/0055937 A1 | 3/2012 | Monk | |
| 2012/0181288 A1 | 7/2012 | Childress | |
| 2012/0266745 A1 | 10/2012 | Warren | |
| 2013/0082062 A1 | 4/2013 | Kawamoto et al. | |
| 2015/0102040 A1 | 4/2015 | Bornes | |

FOREIGN PATENT DOCUMENTS

| | | | |
|---|---|---|---|
| DE | 202013103931 U | 9/2013 | |
| EP | 0056289 A1 | 7/1982 | |
| EP | 124205 A1 | 7/1984 | |
| EP | 0299503 A2 * | 1/1989 | F41H 5/013 |
| EP | 0689991 B1 | 2/1999 | |
| EP | 1147934 A1 | 10/2001 | |
| EP | 2048079 A2 | 4/2009 | |
| FR | 493293 A | 8/1919 | |
| FR | 2101483 A5 | 3/1972 | |
| FR | 2264566 A1 | 10/1975 | |
| FR | 3011822 A1 | 4/2015 | |
| GB | 191217292 A | 11/1912 | |
| GB | 367579 A | 2/1932 | |
| GB | 565121 A | 10/1944 | |
| GB | 0567936 A | 3/1945 | |
| GB | 584741 A | 1/1947 | |
| GB | 585517 A | 2/1947 | |
| GB | 685440 A | 1/1953 | |
| GB | 1234675 A | 5/1971 | |
| GB | 1510860 A | 5/1978 | |
| GB | 2054456 A | 2/1981 | |
| GB | 2054457 A | 2/1981 | |
| GB | 2088806 A | 6/1982 | |
| GB | 2124887 A * | 2/1984 | F41H 5/0478 |
| GB | 2155873 A | 10/1985 | |
| GB | 2198099 A | 6/1988 | |
| GB | 2275455 A | 8/1994 | |
| JP | 2007237776 A | 9/2007 | |
| WO | 1996039335 A1 | 12/1996 | |
| WO | 0034121 A1 | 6/2000 | |
| WO | WO 2006015456 A1 * | 2/2006 | B64D 37/32 |
| WO | 2012101439 A1 | 8/2012 | |
| WO | 2012173594 A1 | 12/2012 | |

OTHER PUBLICATIONS

Great Britain Combination Exam and Search Report of Application No. GB1507725.8, dated Nov. 3, 2015, 6 pages.
Great Britain Search Report of Application No. GB1408013.9, dated Nov. 19, 2014, 4 pages.
Extended European Search Report of Application No. EP14275102, dated Oct. 28, 2014, 9 pages.
International Search Report and Written Opinion of Applciation No. PCT/GB2015/051322, dated Jul. 2, 2015, 14 pages.
Extended European Search Report of Application No. EP14275103, dated Nov. 5, 2014, 9 pages.
Great Britain Search Report of Application GB1408015.4, dated Oct. 29, 2014, 3 pages.
Great Britain Combined Search and Exam Report of Application No. GB1507727.4, dated Oct. 29, 2015, 7 pages.
International Search Report and Written Opinion of Application No. PCT/GB2015/051324, dated Jul. 6, 2015, 12 pages.
International Preliminary Report on Patentability PCT/GB2015/051327, dated Apr. 21, 2016, 18 pages.
Great Britain Search Report for application 1408020.4 dated Oct. 30, 2014, 3 pages.
Great Britain Search and Examination Report of application 1507732.4 dated Oct. 22, 2015, 8 pages.
European Search Report for application 14275107.2 dated Nov. 10, 2014, 10 pages.
International Search Report for application PCT/GB2015/051327 dated Jul. 2, 2015, 10 pages.
European Search Report for application 14275104.9 dated Nov. 5, 2014, 9 pages.
Great Britain Search Report for application 1408016.2 dated Oct. 29, 2014, 3 pages.
Great Britain Search and Examination Report of application 1507724.1 dated Oct. 27, 2015, 7 pages.
International Preliminary Report on Patentability for application PCT/GB2015/051321 dated Apr. 25, 2016, 18 pages.
International Search Report for application PCT/GB2015/051321 dated Jul. 7, 2015, 12 pages.
European Search Report for application 14275105.6 dated Nov. 2, 2014, 8 pages.
Great Britain Search Report for application 1408018.8 dated Oct. 30, 2014, 3 pages.
Great Britain Search and Examination Report for application 1507731.6 dated Oct. 29, 2015, 6 pages.
International Search Report for application PCT/GB2015/051325 dated Jul. 6, 2015, 11 pages.
Great Britain Examination Report of Application No. GB1507727.4, dated Apr. 19, 2016, 1 page.
UK IPO, Examination Report under Section 18(3) of Great Britain Application No. GB1507727.4, dated Apr. 19, 2016, 1 page.
International Preliminary Report on Patentability for application No. PCT/GB2015/051325, dated Nov. 8, 2016, 8 pages.

* cited by examiner

LIQUID STORAGE SYSTEM

RELATED APPLICATIONS

This application is a national phase application filed under 35 USC § 371 of PCT Application No. PCT/GB2015/051324 with an International filing date of May 6, 2015, which claims priority of GB1408015.4 filed May 7, 2014 and EP Patent Application and EP14275103.1 filed May 7, 2014. Each of these applications is herein incorporated by reference in its entirety for all purposes.

FIELD OF THE INVENTION

The present invention relates to liquid storage systems.

BACKGROUND

A high speed projectile on impact with and penetration into a liquid containing tank generates very high pressure in the liquid. This phenomenon, known as hydrodynamic ram, typically includes the generation of shock waves and subsequent pressure pulses in the liquid. These pressures, combined with the penetration damage from the projectile, can cause damage to the tank structure and frequently are the cause of catastrophic failure of the tank. The hydrodynamic ram pressure pulses are intense but of short duration which propagate through the liquid in the tank.

There is thus a need for means for reducing hydrodynamic ram pressure in the liquid in such a tank and for a generally improved tank which has an improved ability to sustain projectile impact without catastrophic failure.

SUMMARY OF THE INVENTION

In a first aspect, the present invention provides a liquid storage system comprising: a tank for containing a liquid, said tank enclosing a liquid storage space; multiple layers of a fabric material; and attachment means attaching the multiple layers of the fabric material to an internal surface of the tank.

The multiple layers of the fabric material may comprise a plurality of fabric sheets arranged as a stack of sheets. The fabric material may comprise aramid or para-aramid fibres. The aramid or para-aramid fibres may be poly-paraphenylene terephthalamide. Each of the layers of the fabric material may have a thickness of less than 0.5 mm. The multiple layers of the fabric material may include at least twenty layers.

The attachment means may include a non-permeable envelope. The envelope may be attached to the internal surface of the tank. The multiple layers of the fabric material may be enclosed in the envelope such that the multiple layers of a fabric are isolated from a fluid in the tank. The envelope may contain a fluid (for example, air) in addition to the multiple layers of the fabric material.

The attachment means may comprise one or more pins. Each pin may comprise a base portion for attachment to an internal surface of a wall of the tank, and a threaded elongate member passing through the multiple layers of the fabric material.

The total cavity volume in the tank of the multiple layers of the fabric material and the attachment means may be less than or equal to 15% by volume of the tank volume.

The multiple layers of the fabric material may be proximate to and substantially parallel with an internal surface of a wall of the tank.

A penetration force required to penetrate a layer of the fabric material may be greater than a force with which the attachment means attaches the multiple layers of the fabric material to the internal surface of the tank.

The multiple layers of the fabric material may cover the entirety of the internal surface of the tank.

In a further aspect, the present invention provides a vehicle comprising a liquid storage system for containing a liquid, the liquid storage system being in accordance with any of the above aspects.

In a further aspect, the present invention provides a method of producing a liquid storage system. The method comprises: providing a tank for containing a liquid, said tank enclosing a liquid storage space; providing multiple layers of a fabric material; and attaching the multiple layers of the fabric material to an internal surface of the tank.

The method may further comprise: providing a non-permeable envelope; placing the multiple layers of a fabric material into the envelope; sealing the envelope with the multiple layers of a fabric material located therein; and attaching the sealed envelope to the internal surface of the tank.

In a further aspect, the present invention provides a liquid storage system comprising a tank for containing a liquid, said tank enclosing a liquid storage space, and an assembly located within the tank and configured to reduce the effects of hydrodynamic ram within the tank. The assembly comprises a plurality of flexible sheets of a material arranged as a stack of sheets, and attachment means for releasably attaching the stack of sheets to an internal surface of the tank.

One or more of the flexible sheets, for example all of the flexible sheets, may be made of a material comprising aramid or para-aramid fibres. The aramid or para-aramid fibres may be poly-paraphenylene terephthalamide.

Each of the flexible sheets may have a thickness of less than 1 mm, for example, less than 0.5 mm.

The assembly may include at least 20 flexible sheets.

The attachment means may comprise one or more pins, each pin comprising a base portion for attachment to an internal surface of a wall of the tank, and a threaded elongate member passing through the plurality of flexible sheets.

The total cavity volume of the assembly in the tank may be less than or equal to 15% by volume of the tank volume.

The assembly may be arranged in the tank such that the plurality of flexible sheets is proximate to and substantially parallel with an internal surface of a wall of the tank.

The assembly may be arranged in the tank such that the stack of flexible sheets is substantially equidistant from two opposite walls of the tank.

The assembly may be configured such that at least part of a sheet becomes detached from the wall of the tank in response to the application of a load force to that sheet.

The assembly may be configured such that the sheets are free to move at least to some extent within the tank relative to each other and with respect to the walls of the tank without becoming detached from the walls of the tank.

The tank may be an aircraft fuel tank.

In a further aspect, the present invention provides a vehicle (e.g. an aircraft) comprising a liquid storage system for containing a liquid, the liquid storage system being in accordance with the preceding aspect.

In a further aspect, the present invention provides an assembly for reducing the effects of hydrodynamic ram in a liquid in a tank in which it is located. The assembly comprises a plurality of flexible sheets of a material arranged as a stack of sheets, and attachment means for releasably attaching the stack of sheets to an internal surface of the tank. The flexible sheets are made of a material comprising aramid or para-aramid fibres.

DETAILED DESCRIPTION

Figure 1:
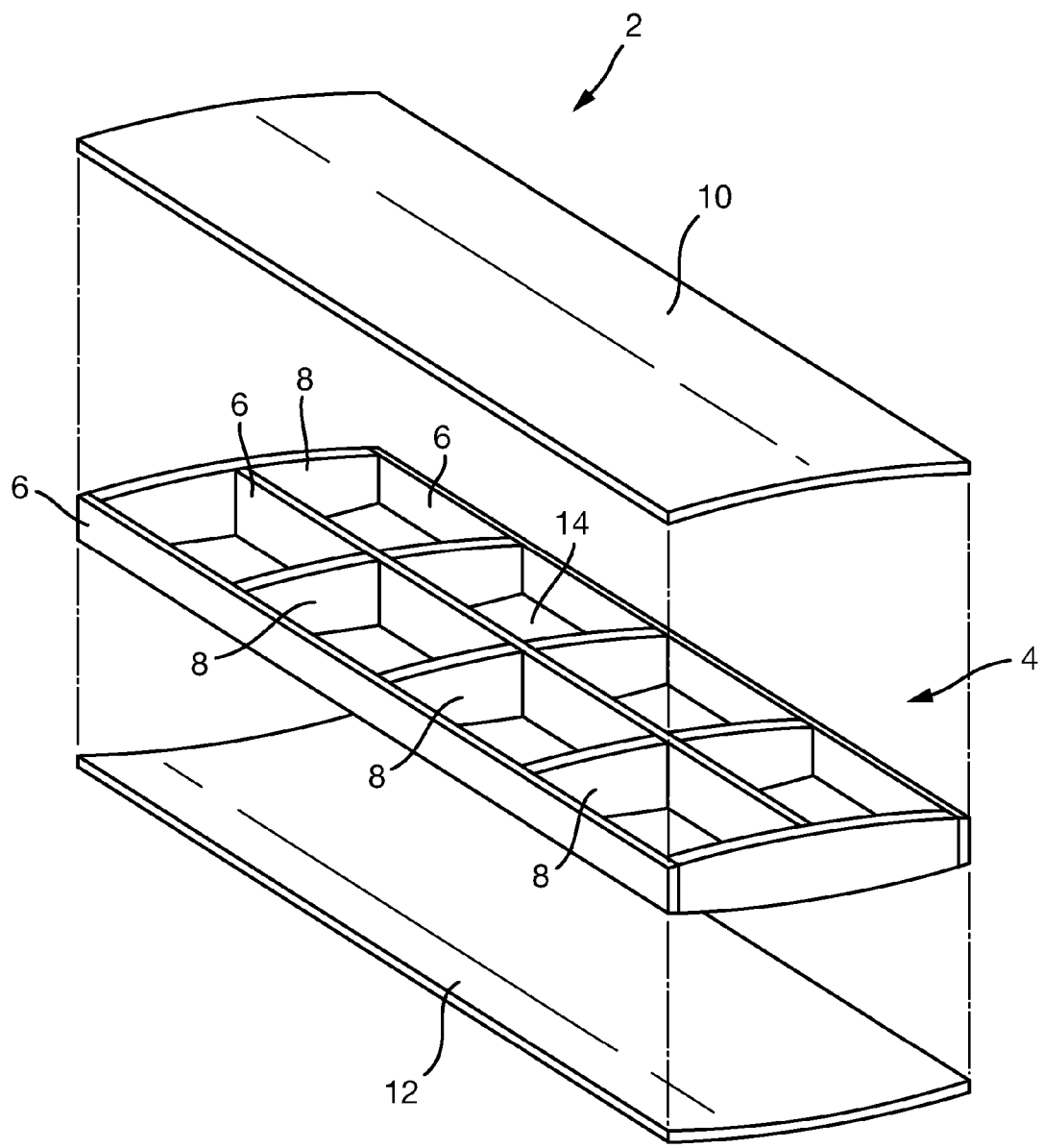
FIG. 1 is a schematic illustration (not to scale) of an exploded view of an example aircraft wing in which an embodiment of a assembly is implemented.

In the following description, like reference numerals refer to like elements.

The following description is based on embodiments of the invention and should not be taken as limiting the invention with regard to alternative embodiments that are not explicitly described herein. Structural material types and methods of construction identified are examples only.

It will be appreciated that relative terms such as top and bottom, upper and lower, and so on, are used merely for ease of reference to the Figures, and these terms are not limiting as such, and any two differing directions or positions and so on may be implemented.

FIG. 1 is a schematic illustration (not to scale) of an exploded view of an example aircraft wing 2 in which embodiments of a hydrodynamic ram reducing assembly are implemented.

The aircraft wing 2 comprises a substructure 4 comprising a plurality of spars 6 and ribs 8. The spars 6 are spaced apart from one another and are aligned along the length of the aircraft wing 2. The spars 6 are coupled together by the spaced apart ribs 8 which are substantially perpendicular to the spars 6. The spars 6 and ribs 8 are connected together by fasteners (not shown in the Figures). The spars 6 and ribs 8 are made of carbon fibre composite (CFC) material, i.e. a composite material comprising a polymer matrix reinforced with carbon fibres. In other examples, the spars 6 and ribs 8 are made of a different appropriate material, for example, aluminium.

The aircraft wing 2 further comprises external skins, namely an upper skin 10 and a lower skin 12. The upper skin 10 comprises a plurality of panels made of CFC material. The upper skin 10 is attached to an upper surface of the substructure 4 by fasteners (not shown in the Figures). The lower skin 12 comprises a plurality of panels made of CFC material. The lower skin 12 is attached to a lower surface of the substructure 4 by fasteners (not shown in the Figures). The external skin 10, 12 may each be, for example, 8 mm thick.

When the substructure 4 and the external skins 10, 12 are attached together (and, for example, bonded with a sealant), a cavity defined by the substructure 4 and skins 10, 12 is formed. Such a cavity is used as a fuel tank for storing aircraft fuel and is indicated in FIG. 1 by the reference numeral 14. The fuel tank is described in more detail later below with reference to FIG. 2.

The aircraft wing 2 further comprises a leading edge structure, a trailing edge structure and a wing tip structure, which are not shown in FIG. 1 for reasons of clarity.

Figure 2:
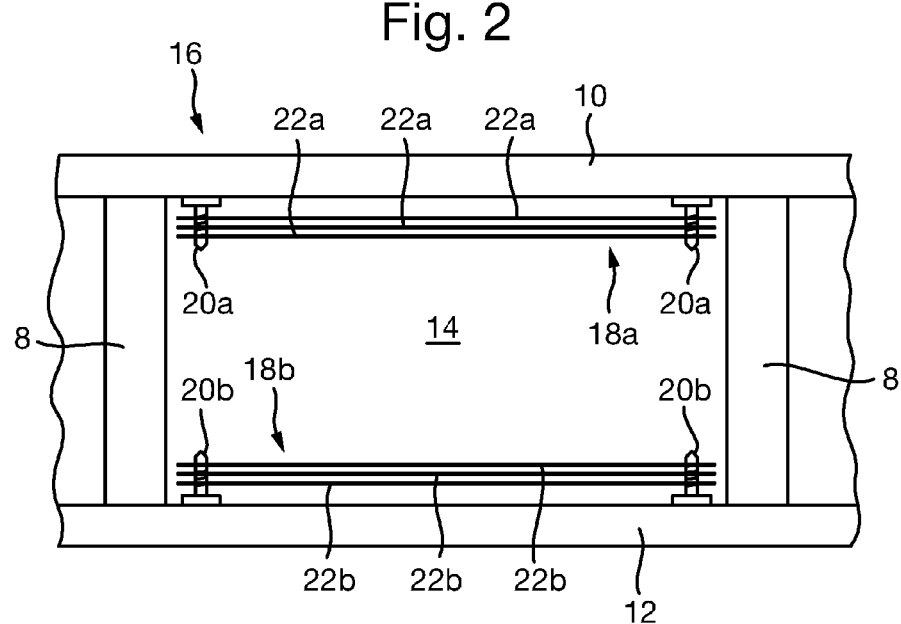
FIG. 2 is a schematic illustration (not to scale) showing a cross section through a fuel tank in which an embodiment of a hydrodynamic ram reducing assembly is implemented.

FIG. 2 is a schematic illustration (not to scale) showing a cross section through the fuel tank 16 in the aircraft wing 2 in which a first embodiment of a hydrodynamic ram reducing assembly is implemented.

The outer walls of the fuel tank 16 are provided by spars 6, ribs 8, and the upper and lower skins 10, 12. Aircraft fuel is stored in the cavity 14 defined by the fuel tank outer walls.

In this embodiment, the fuel tank 16 comprises two hydrodynamic ram reducing assemblies, hereinafter referred to as "the first assembly" and the "second assembly" and indicated in FIG. 2 by the reference numerals 18a and 18b respectively. The first assembly 18a is attached to an internal surface of the upper skin 10, i.e. the surface of the upper skin 10 that is inside the fuel tank 16. The second assembly 18b is disposed on an internal surface of the lower skin 12, i.e. the surface of the lower skin 12 that is inside the fuel tank 16.

In this embodiment, the first assembly 18a comprises a plurality of threaded pins, hereinafter the "first pins" 20a, and a plurality of sheets of material, hereinafter the "first sheets" 22a. Similarly, the second assembly 18b comprises a plurality of threaded pins, hereinafter the "second pins" 20b, and a plurality of sheets of material, hereinafter the "second sheets" 22b.

Each of the pins 20a, 20b comprises a base portion and a threaded elongate member attached to the base portion at one end and extending perpendicularly away from the base portion to a free pointed end. The base portion of each of the first pins 20a is attached to the upper skin 10 by a suitable attachment means, for example an adhesive, such that the elongate members of the first pins 20a are substantially perpendicular to the upper skin 10. Likewise, the base portion of each of the second pins 20b is attached to the lower skin 12 by a suitable attachment means, for example an adhesive, such that the elongate members of the second pins 20b are substantially perpendicular to the lower skin 12.

In this embodiment, the first pins 20a are located at or proximate to the edges of the internal surface of the portion of the upper skin 10 that forms a wall of the fuel tank 16, i.e. at or proximate to the spars 6 and ribs 8. The first sheets 22a are attached to the first pins 20a so as to form a stack of sheets proximate to and substantially parallel with the internal surface of the upper skin 10. Preferably, the first sheets 22a cover substantially the entirety of the portion of the internal surface of the upper skin 10 that defines the fuel tank 16. The first sheets 22a may be attached to the first pins 20a by pushing the first sheets 22a onto the elongate members of the first pins 20a so that the elongate members of the first pins 20a pass through each of the first sheets 22a. The threaded portions of the elongate members of the first pins 20a tend to loosely retain the first sheets 22a on the first pins 20a, i.e. such that the first sheets 22a may be released or detached from the first pins 20a e.g. as described in more detail later below with reference to FIG. 3. Preferably, the first sheets 22a are not pulled taught between the first pins 20a, and instead the first sheets 22a are relatively loose, i.e. the intermediate portions of the first sheets 22a between the first pins 20a are free to move (e.g. towards/away from the upper skin 10) at least to some degree. Preferably, there are at least 5 first sheets 22a. More preferably, there are at least 10 first sheets 22a. More preferably, there are at least 20 first sheets 22a, e.g. between 20 and 30 first sheets 22a. In some embodiments, there are more than 30 first sheets 22a.

In this embodiment, the second pins 20b are located at or proximate to the edges of the internal surface of the portion of the lower skin 12 that forms a wall of the fuel tank 16, i.e. at or proximate to the spars 6 and ribs 8. The second sheets 22b are attached to the second pins 20b so as to form a stack of sheets proximate to and substantially parallel with the internal surface of the lower skin 12. Preferably, the second sheets 22b cover substantially the entirety of the portion of the internal surface of the lower skin 12 that defines the fuel tank 16. The second sheets 22b may be attached to the second pins 20b by pushing the second sheets 22b onto the elongate members of the second pins 20b so that the elongate members of the second pins 20b pass through each of the second sheets 22b. The threaded portions of the elongate members of the second pins 20b tends to loosely retain the second sheets 22b on the second pins 20b, i.e. such that the second sheets 22b may be released or detached from the second pins 20b e.g. as described in more detail later below with reference to FIG. 3. Preferably, the second sheets 22b are not pulled taught between the second pins 20b, and instead the second sheets 22b are relatively loose, i.e. the intermediate portions of the second sheets 22b between the second pins 20b are free to move (e.g. towards/away from the lower skin 12) at least to some degree. Preferably, there are at least 5 second sheets 22b. More preferably, there are at least 10 second sheets 22b. More preferably, there are at least 20 second sheets 22b, e.g. between 20 and 30 second sheets 22b. In some embodiments, there are more than 30 second sheets 22b.

In this embodiment, the first and second sheets 22a, 22b are flexible sheets made of a fibre-based material, for example woven, crimped/stitched or a mat of fibres. In this embodiment, the sheets 22a, 22b are fabric. The fabric may include ballistic fibres. Each of the sheets 22a, 22b is thin, for example, each sheet may have a thickness of between 0.1 mm and 0.5 mm, for example 0.25 mm. Preferably, the sheets 22a, 22b are less than 1 mm thick. More preferably, the sheets 22a, 22b are less than 0.5 mm thick. Each of the sheets 22a, 22b is made of a tough and strong material such as an aramid or para-aramid synthetic fibre-based material such as poly-paraphenylene terephthalamide (which is more common known as KEVLAR™) or TWARON™, or UHM-WPE fibres (spectra, dyneema).

In this embodiment, the sheets 22a, 22b are substantially continuous. However, in other embodiments, one or more of the sheets is not continuous, for example, one or more of the sheets may include a plurality of perforations, e.g. a sheet may be made of a mesh or net-like material.

Preferably, the size of the components of the assemblies 18a-d are such that the assemblies 18a-d occupy less than 15% of the total internal volume (i.e. capacity) of the fuel tank 16. In other embodiments, the assemblies 18a-d occupy a different proportion of the fuel tank capacity.

As will now be described in more detail, the assemblies 18a-d are operable to reduce hydrodynamic ram pressure in the fuel contained within the fuel tank 16 resulting from impact of a projectile with an external surface of the fuel tank 16.

Figure 3:
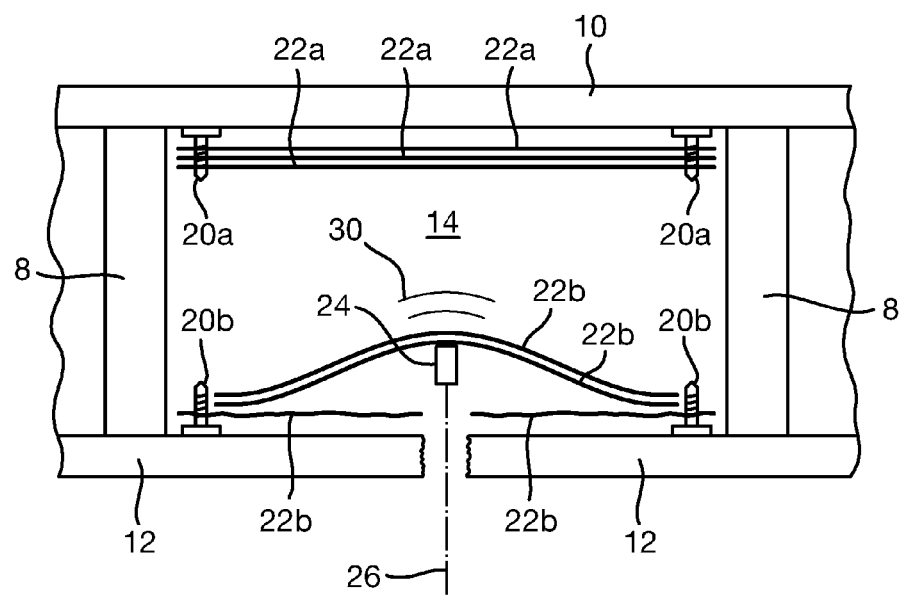
FIG. 3 is a schematic illustration (not to scale) illustrating effects of a projectile impacting with an external surface of the fuel tank of FIG. 2.

FIG. 3 is a schematic illustration (not to scale) illustrating effects of a projectile 24 impacting with the lower skin 12 of the fuel tank 16. The path of the projectile through the lower skin 12 is indicated in FIG. 3 by the reference numeral 26.

The projectile 24 may be any appropriate projectile or foreign object such as a bullet, warhead fragment, a vehicle part, a rock, a maintenance tool, hail, ice, a bolt, etc. An example projectile has a weight of approximately 3.5 g, is substantially spherical in shape having a diameter of approximately 9.5 mm, and travels with a velocity of 1500 m/s. A further example projectile is a 44 g 12.5 mm bullet that travels with a velocity of 500 m/s.

In this example, the projectile 24 initially impacts with an external surface of the lower skin 12 and travels through the lower skin 12. The projectile 24 causes high strain rate shear damage to the lower skin 12 resulting in a hole in the lower skin 12 approximately the size of the projectile 24.

In this example, after passing through the lower skin 12, the projectile 24 impinges upon one or more of the second sheets 22b. The second sheet or sheets 22b impinged upon by the projectile 24 tend to be deflected and accelerated at least to some extent. The projectile 24 impacting with one or more of the second sheets 22b tends to retard the passage of the projectile 24 into the fuel tank 16. Furthermore, impact kinetic energy of the projectile 24 tends to be used to deflect and accelerate at least one of the second sheets 22b through the fluid in the fuel tank 16, thereby reducing the energy introduced into the fluid directly by the projectile 24.

Deflection of the second sheets 22b by the projectile tends to be facilitated by the second sheets not being taught, i.e. being relatively "loose" and able to move to some degree within the fuel tank 16.

In this example, when travelling through the fuel, the projectile 24 in combination with the second sheets 22b moved by the projectile 24 tends to experience a greater overall drag force from the fluid in the fuel tank 16 compared to that that would be experienced by the projectile 24 if the second sheets 22b were not present. This tends to be at least in part due to the increased surface area of the combination of the projectile 24 and second sheets 20b compared to projectile 24 alone. Thus, the passage of the projectile 24 through the fluid in the fuel tank 16 tends to be retarded.

In some situations, the projectile 24 may travel through (i.e. pierce or penetrate) one or more of the second sheets 22b. In such cases, impact energy of the projectile 24 is used to pierce those second sheets 22b, thereby reducing the energy introduced into the fluid by the projectile 24 and retarding at least to some extent the passage of the projectile 24 into the fluid. The likelihood of the projectile 24 piercing the second sheets 22b may be reduced by making the second sheets 22b from a strong, tough material such as Kevlar™.

In some situations, the projectile 24 does not travel through (i.e. does not pierce or penetrate) one or more of the second sheets 22b.

In some cases where the projectile 24 does not pierce one or more of the second sheets 22b, one or more of the second sheets 22b may be detached from one or more of the second pins 20b. In other words, the projectile 24 may "pull" one or more of the second sheets 22b from one or more of the second pins 20b so that those sheets are free to move with the projectile 24. Such detachment of the second sheets 22b from the second pins 20b is facilitated by the second sheets 22b being only loosely retained by the second pins 20b. In other words, in some embodiments the sheets are releasably attached to fuel tank walls, e.g., by threaded pins. In some embodiments, releasable attachment of the sheets to the walls of the fuel tank 16 is provided by a force required for the projectile 24 to penetrate a sheet (i.e. a penetration force)

being greater than a force required to detach that sheet from the wall of the fuel tank 16 (i.e. a force that retains that sheet against the wall of the fuel tank 16). In some embodiments, releasable attachment of the sheets to the walls of the fuel tank 16 is provided by a tensile and/or compressive strength of a sheet being greater than a force required to detach that sheet from the wall of the fuel tank 16 (i.e. a force that retains that sheet against the wall of the fuel tank 16).

The second sheets 22b that are detached from the second pins 20b by the projectile 24 advantageously tend to "wrap around" the projectile 24 at least to some extent, for example, due to the movement of the projectile 24 through the fluid in the fuel tank 16. The projectile 24 with one or more of the second sheets coupled thereto tends to have a much larger surface area than the projectile 24 alone. Thus, the projectile 24 with one or more of the second sheets coupled thereto tends to experience a greater drag force when moving through the fluid in the fuel tank 16 compared to that that would be experienced by the projectile 24 alone. Thus, the passage of the projectile 24 through the fluid in the fuel tank 16 tends to be retarded. The retardation of the passage of the projectile 24 through the fluid tends to decrease the likelihood of the projectile 24 impacting with the upper skin 10. Thus, the likelihood of a hole being formed in the upper skin 10 tends to be reduced. Furthermore, the increase in drag on the projectile 24 tends to mean that a greater portion of the impact energy is absorbed by the fluid in the fuel tank 16. Thus, forces exerted on the walls of the fuel tank 16 tend to be reduced.

In some cases where the projectile 24 does not pierce one or more of the second sheets 22b, one or more of the second sheets 22b are not detached from the second pins 20b. Thus, the projectile 24 may be prevented from travelling further into the fuel tank 16. At least some of the impact energy of the projectile 24 tends to be absorbed by the second sheets 22b and the second pins 20b and therefore not transferred to the aircraft substructure 4.

In this example, on impact of the projectile 24 with the fuel tank 16, one or more high pressure shock waves 30 tend to be generated. These shock waves 30 tend to be of lower energy than a shock wave or shock waves experienced in a conventional system due to at least some of the impact energy of the projectile 24 being absorbed by the second assembly 18b. Furthermore, the assemblies tend to disrupt the shockwaves travelling through the fluid in the fuel tank 16 and thereby tend to insulate the upper and lower skins 10, 12 at least to some extent. Thus, pressures resulting from the shock waves 30 exerted on the walls of the fuel tank 16 tend to be lower than the shock wave pressures experienced in conventional fuel tanks. Thus, the likelihood of damage to the walls of the fuels tank 16 (e.g. decoupling of the external skin 10, 12 from the spars 6 or ribs 8) tends to be reduced.

In this example, as the projectile 24 passes through the fluid in the fuel tank 16, a cavitation "wake" may form behind the projectile 24, i.e. a region of low pressure (e.g. a vapour or a vacuum) may form in the wake of the projectile 24. This causes a fluid displacement and an increase in the pressure of the fluid in the fuel tank 16. Due to the passage of the projectile 24 through the fuel tank 16 being retarded at least to some degree by the second sheets 22b, the increased fluid pressure resulting from cavitation caused by the projectile 24 tends to be decreased compared to conventional systems. Thus, pressures resulting from cavitation exerted on the walls of the fuel tank 16 tend to be lower than in conventional systems. Thus, the likelihood of damage to the walls of the fuels tank 16 (e.g. decoupling of the external skin 10, 12 from the spars 6 or ribs 8) tends to be reduced.

Additionally, in this example, the first assembly 18a (which is disposed on the upper skin 10) is located within the fuel tank 16 such that the shock waves 30 resulting from compression of the fluid in the fuel tank 16 resulting from impact of the projectile 24 with the lower skin 12 impinge on the first assembly 18a so that the shock waves 30 interact with the first assembly 18a before impinging on the upper skin 10. The first assembly 18a may reflect incident shock waves at least to some extent. Also, the first assembly 18a tends to be a relatively poor transmitter of impinging shock waves 30. Thus, the amplitude of the shock waves 30 impinging upon the upper skin 10 tends to be reduced and consequently the pressure experienced by the upper skin 10 tends to be diminished by the presence of the first assembly 18a. The assemblies 18a, 18b advantageously tend to decouple the fluid from walls of the fuel tank 16.

Furthermore, were the projectile 24 to continue through the cavity 14 and impact with the first assembly 18a, the first assembly 18a would tend to cause further retardation of the projectile 24, thereby further reducing impact energy and reducing force experienced by at least the upper skin 10.

Figure 4:
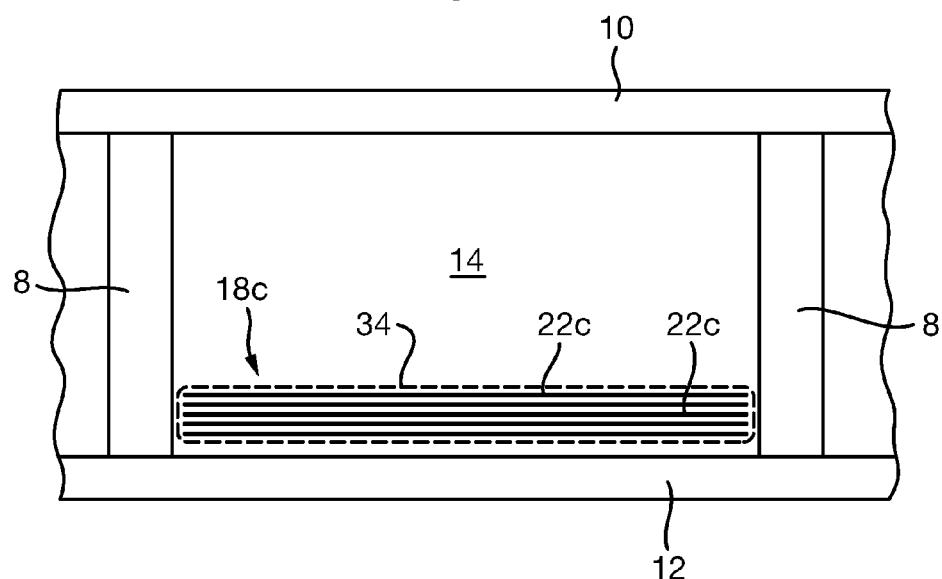
FIG. 4 is a schematic illustration (not to scale) showing a cross section through a fuel tank in which a further embodiment of a hydrodynamic ram reducing assembly is implemented.

FIG. 4 is a schematic illustration (not to scale) showing a cross section through the fuel tank 16 in the aircraft wing 2 in which a second embodiment of a hydrodynamic ram reducing assembly is implemented.

In this embodiment, the fuel tank 16 comprises a hydrodynamic ram reducing assembly, hereinafter referred to as "the third assembly" and indicated in FIG. 4 by the reference numerals 18c. The third assembly 18c is attached to an internal surface of the lower skin 12.

The third assembly 18c comprises a plurality of sheets of material, hereinafter referred to as the "third sheets" 22c, and an envelope 34.

In this embodiment, the third sheets 22c are arranged as a stack of sheets. The stack of third sheets 22c are encased, i.e. wholly contained, within the envelope 34. The envelope 34 is a non-permeable membrane such that the third sheets 22c are isolated from fluid (e.g. aircraft fuel) in the fuel tank 16.

An example method of producing the third assembly 18c is as follows. Firstly, the third sheets 22c are stacked together, i.e. arranged as a stack of sheets atop one another. Secondly the stack of third sheets 22c is placed into the envelope 34. Thirdly, air is drawn out of the envelope 34. Lastly, the envelope 34 is sealed. The seal of the envelope 34 is an air-tight seal.

In some embodiments, substantially all of the air is drawn out of the envelope 34 such that the third sheets 22c are held in a vacuum within the envelope 34. This tends to provide that the third sheets 22c are forced together and provides for relatively high friction between the third sheets 22c.

In some embodiments, some air, or another fluid, is retained in the envelope 34. For example, air may be trapped between the third sheets 22c within the envelope 34. Thus, the envelope 34 may include a cavity with a volume sufficient to allow a shock wave or waves in the liquid in the fuel tank 16, resulting from compression of the liquid by impact of a projectile on the tank external surface and thus in the liquid, to be reduced by expansion of the compressed liquid into the cavity volume, thereby to reduce the hydraulic ram pressure in the liquid in the fuel tank 16. Preferably, the fluid (e.g. air) in the cavity in the envelope 34 has a density sufficiently different from the density of the liquid in the fuel tank 16 to provide that the cavity is crushable. Preferably, the fluid (e.g. air) in the cavity in the envelope 34 has a density sufficiently different from the density of the liquid in the fuel tank 16 to provide substantially total reflection within the third assembly 18c of the shock wave or waves impinging on the third assembly 18c thereby to reduce the hydraulic ram pressure in the liquid in the fuel tank 16.

In this embodiment, the envelope 34 is fixedly attached, using an adhesive, to the internal surface of the lower skin 12 that defines the fuel tank 16. Preferably, substantially the entirety of the underside of the envelope 34 is fixed to the internal surface of the lower skin 12, for example, by a layer of adhesive that has been applied to the entirety of the lower surface of the envelope 34. The terminology "layer of adhesive" very broadly refers to any type of coating layer which is adhesive/tacky towards an arbitrary kind of surface, such as in particular towards an aircraft skin surface.

In other embodiments, only part of the underside of the envelope 34 is fixed to the internal surface of the lower skin 12, for example, in some embodiments the envelope 34 is attached to the fuel tank 16 along one or more edges of the envelope 34, and an intermediate portion of the envelope 34 is not directly adhered to the tank walls.

In this embodiment, the third assembly 18c is fixedly attached to the walls of the fuel tank 16. In some embodiments, fixed attachment of the envelope 34 to the walls of the fuel tank 16 is provided by a force required to detach the envelope 34 from the wall of the fuel tank 16 (i.e. a force with which the layer of adhesive retains the envelope 34 against the wall of the fuel tank 16) being greater than a force required for the projectile 24 to penetrate the envelope 34 and/or a sheet (i.e. a penetration force). In some embodiments, fixed attachment of the envelope 34 to the walls of the fuel tank 16 is provided by a force required to detach the envelope 34 from the wall of the fuel tank 16 (i.e. a force with which the layer of adhesive retains the envelope 34 against the wall of the fuel tank 16) being greater than tensile and/or compressive strength of that sheet.

In other embodiments, the third assembly 18c may be releasably attached to fuel tank walls, e.g., by threaded pins or other releasable attachment means.

In this embodiment, in the fuel tank 16, internal static pressure of fuel in the fuel tank 16 tends to push the third sheets 22c of the third assembly 18c together, and against the internal surface of the fuel tank 16. This tends to result in increased friction between the third sheets 22c. An increased level of impact energy of the projectile 24 tends to be absorbed by the movement and deformation of the third sheets 22c, for example, due to having to overcome the increased friction between individual third sheets 22c as they move relative to each other during penetration.

Preferably, the third sheets 22c cover substantially the entirety of the portion of the internal surface of the lower skin 12 that defines the fuel tank 16.

Preferably, there are at least 5 third sheets 22c. More preferably, there are at least 10 third sheets 22c. More preferably, there are at least 20 third sheets 22c. Surprisingly, having air trapped within the envelope 34 of the third assembly tends to provide a hydrodynamic ram damage reduction equivalent to having a greater number of sheets in the assembly. Thus, by having air trapped within the envelope 34, an improved solution, with regard to minimising assembly mass and quantity of fluid displaced from the fuel tank due to the presence of the assembly, tends to be provided.

In this embodiment, the third sheets 22c are flexible sheets made of a fibre-based material, for example woven, crimped/stitched or a random matting of fibres. In this embodiment, the third sheets 22c are fabric. The fabric may include ballistic fibres. Each of the third sheets 22c is thin, for example, each sheet may have a thickness of between 0.1 mm and 0.5 mm, for example 0.25 mm. Preferably, the third sheets 22c are less than 1 mm thick. More preferably, the third sheets 22c are less than 0.5 mm thick. Each of the third sheets 22c is made of a tough and strong material such as an aramid or para-aramid synthetic fibre-based material such as poly-paraphenylene terephthalamide (which is more commonly known as KEVLAR™ or TWARON™, or UHMWPE fibres (spectra, dyneema).

In this embodiment, the third sheets 22c are substantially continuous. However, in other embodiments, one or more of the third sheets 22c is not continuous, for example, one or more of the sheets may include a plurality of perforations, e.g., a sheet may be made of a mesh or net-like material.

Preferably, the third assembly 18c occupies less than 15% of the total internal volume (i.e. capacity) of the fuel tank 16.

In this embodiment, the fuel tank 16 includes a single third assembly 18c. However, in other embodiments, the fuel tank 16 includes one or more further assemblies, such as a further third assembly 18c, or a different type of assembly such as a first or second assembly 18a, 18b. For example, in some embodiments, the fuel tank 16 includes a further third assembly that is attached to the portion of the internal surface of the upper skin 10 that defines the fuel tank 16.

As will now be described in more detail, the third assembly 18c reduces hydrodynamic ram pressure in the fuel contained within the fuel tank 16 resulting from impact of a projectile with an external surface of the fuel tank 16.

Figure 5:
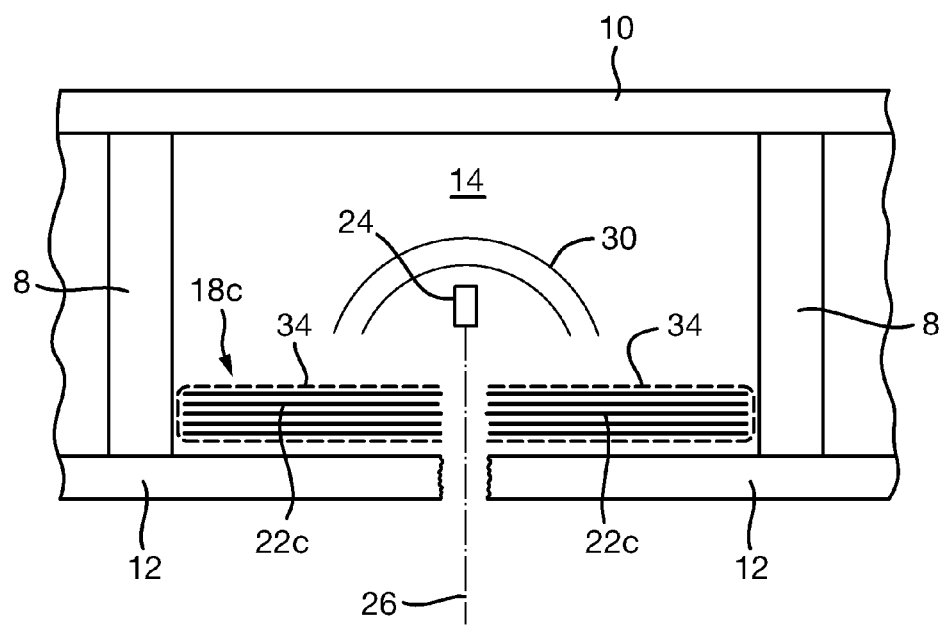
FIG. 5 is a schematic illustration (not to scale) illustrating effects of a projectile impacting with an external surface of the fuel tank of FIG. 4.

FIG. 5 is a schematic illustration (not to scale) illustrating effects of a projectile 24 impacting with the lower skin 12 of the fuel tank 16. The path of the projectile through the lower skin 12 is indicated in FIG. 5 by the reference numeral 26.

The projectile 24 may be any appropriate projectile or foreign object such as a bullet, warhead fragment, a vehicle part, a rock, a maintenance tool, hail, ice, a bolt, etc.

In this example, the projectile 24 initially impacts with an external surface of the lower skin 12 and travels through the lower skin 12. The projectile 24 causes high strain rate shear damage to the lower skin 12 resulting in a hole in the lower skin 12 approximately the size of the projectile 24. After passing through the lower skin 12, the projectile 24 impacts with the third assembly 18c. On impact of the projectile 24 with the third assembly 18c, the third assembly 18c tends to be deflected and accelerated at least to some extent. The projectile 24 impacting with the third assembly 18c tends to retard the passage of the projectile 24 into the fuel tank 16. Furthermore, impact kinetic energy of the projectile 24 tends to be used to deflect and accelerate one or more of the third sheets 22c, thereby reducing the energy introduced into the fluid directly by the projectile 24.

Deflection of the third sheets 22c by the projectile tends to be facilitated by the third sheets 22c not being relatively flexible and able to move to some degree within the fuel tank 16.

In this example, the projectile 24 travels through (i.e. pierces or penetrates) the third sheets 22c. Impact energy of the projectile 24 is used to pierce the third sheets 22c, thereby reducing the energy introduced into the fluid by the projectile 24 and retarding at least to some extent the passage of the projectile 24 into the fluid.

In some situations, the projectile 24 does not travel through (i.e. does not pierce or penetrate) one or more of the third sheets 22c. In this example, when travelling within the cavity 14 of the fuel tank 16, the projectile 24 in combination with the third assembly sheets 22c moved by the projectile 24 tends to experience a greater overall drag force from the fluid in the fuel tank 16 compared to that that would be experienced by the projectile 24 if the third sheets 22c were not present. This tends to be at least in part due to the increased surface area of the combination of the projectile 24 and second sheets 20b compared to projectile 24 alone. Thus, the passage of the projectile 24 through the fluid in the fuel tank 16 tends to be retarded. Retardation of the passage of the projectile 24 through the fluid tends to decrease the likelihood of the projectile 24 impacting with the upper skin 10. Thus, the likelihood of a hole being formed in the upper skin 10 tends to be reduced.

In this example, on impact of the projectile 24 with the fuel tank 16, one or more high pressure shock waves 30 tend to be generated. These shock waves 30 tend to be of lower energy than a shock wave or shock waves experienced in a conventional system due to at least some of the impact energy of the projectile 24 being absorbed by the third assembly 18c. Furthermore, the third assembly 18c tends to disrupt the shockwaves 30 travelling through the fluid in the fuel tank 16 and thereby tends to insulate the upper and lower skins 10, 12 at least to some extent. Thus, pressures resulting from the shock waves 30 exerted on the walls of the fuel tank 16 tend to be lower than the shock wave pressures experienced in conventional fuel tanks. Thus, the likelihood of damage to the walls of the fuels tank 16 (e.g. decoupling of the external skin 10, 12 from the spars 6 or ribs 8) tends to be reduced.

The projectile 24 travelling through the third assembly 18c tends to generate shockwaves 30 within the fuel tank 16 that travel in directions outwards and along the lower aircraft skin 12. Advantageously, the arrangement of the third sheets 22c, for example the relatively high friction between the third sheets 22c, tends to provide that at least part of the kinetic energy causing such shockwaves 30 is absorbed by the third assembly 18c. In addition, the air or fluid trapped within the third assembly envelope 34 substantially reflects and/or reduces the shock pressures moving across the lower skin 12. Further, shockwaves 30 travelling across the surface of the third assembly 18c to the edges of the fuel tank 16 where the lower external skin 12 is coupled to the spars 6 and ribs 8 tend to be reduced. Thus, the amplitudes of the shockwaves 30 that impinge upon the external skins 10, 12, the spars 6, and the ribs 8 tend to be diminished.

In this example, as the projectile 24 passes through the fluid in the fuel tank 16, a cavitation "wake" may form behind the projectile 24, i.e. a region of low pressure (e.g. a vapour or a vacuum) may form in the wake of the projectile 24. This causes a fluid displacement and an increase in the pressure of the fluid in the fuel tank 16. Due to the passage of the projectile 24 through the fuel tank 16 being retarded at least to some degree by the third assembly 18c, the increased fluid pressure resulting from cavitation caused by the projectile 24 tends to be decreased compared to conventional systems. Thus, pressures resulting from cavitation exerted on the walls of the fuel tank 16 tend to be lower than in conventional systems. Thus, the likelihood of damage to the walls of the fuels tank 16 (e.g. decoupling of the external skin 10, 12 from the spars 6 or ribs 8) tends to be reduced.

In some cases, the projectile 24 does not pierce one or more of the third sheets 22c. In such cases, one or more of the third sheets 22c move with the projectile 24 away from other third sheets 22c in the envelope 34. The projectile 24 with one or more of the third sheets 22c coupled thereto tends to have a much larger surface area than the projectile 24 alone. Thus, the projectile 24 with one or more of the third sheets 22c coupled thereto tends to experience a greater drag force when moving through the fluid in the fuel tank 16 compared to that that would be experienced by the projectile 24 alone. Thus, the passage of the projectile 24 through the fluid in the fuel tank 16 tends to be retarded. Thus, the likelihood of a hole being formed in the upper skin 10 tends to be reduced. Furthermore, the increase in drag on the projectile 24 tends to mean that a greater portion of the impact energy is absorbed by the fluid in the fuel tank 16. Thus, forces exerted on the walls of the fuel tank 16 tend to be reduced.

In some cases where the projectile 24 does not pierce one or more of the third sheets 22c, those third sheets 22c may remain fixedly attached to the wall of the fuel tank 16 by the envelope 34. Thus, the projectile 24 may be prevented from travelling further into the fuel tank 16. At least some of the impact energy of the projectile 24 tends to be absorbed by the third sheets 22c and therefore not transferred to the aircraft substructure 4. Also, the fluid-proof envelope 34 tends to prevent fluid exiting the fuel tank 16 via the hole pierced in the lower skin 12 by the projectile 24.

An advantage provided by the above described assemblies is that hydrodynamic ram damage to a fuel tank caused by an object impacting with an external surface of the fuel tank tends to be reduced or eliminated. Hydrodynamic pressures and their associated structural responses tend to be reduced or eliminated. Thus, the likelihood of catastrophic failure of the fuel tank and corresponding aircraft loss tends to be reduced or eliminated.

The above described assemblies advantageously tend to be relative easy and cheap to manufacture.

The above described assemblies tend to be relatively easy to retrofit to existing aircraft fuel tanks.

The above described assemblies tend to provide protection against hydrodynamic ram damage whilst occupying a relatively small amount of the fuel tank's capacity.

The above described assemblies tend to be relatively lightweight so as not to be a significant burden to the aircraft.

In some embodiment, the stack of sheets of an assembly is enclosed in an envelope, i.e. a container, such as a sealed bag which may be made of a liquid impermeable material such as a plastic. This advantageously tends to facilitate fitting of the assembly into the fuel tank. Furthermore, this advantageously tends to prevent or oppose contamination of the fuel within the fuel tank with contaminants that may be present in or on the sheets (e.g. water or loose sheet fibres). Furthermore, this advantageously tends to prevent or oppose the sheets of the assembly becoming saturated with fuel in the fuel tank.

In the above embodiments, the assemblies are implemented in an aircraft wing fuel tank. However, in other embodiments, the assemblies are used in a different type of container for containing fluid. In some embodiment, one or more walls of the container may be made of a different material to that described above.

In the above embodiments, assemblies are disposed on the internal surfaces of the upper and/or lower aircraft skins. However, in other embodiments an assembly may be disposed on a different surface of the fuel tank instead of or in addition to one or both of the internal surfaces of the upper and lower aircraft skins. For example, in some embodiments, all internal surfaces of the fuel tank have one or more assemblies attached thereto. In some embodiments, an assembly is only disposed on a single surface of the fuel tank, for example, on only the internal surfaces of the lower aircraft skin.

In the above embodiments, the sheets of the assemblies are attached to the walls of the fuel tank by threaded pins, or by being contained in an envelope that is adhered to the fuel tank wall. However, in other embodiments, one or more of the sheets of one or more of the assemblies may be attached to a wall of the fuel tank using a different appropriate attachment means. For example, a pin having one or more barbs arranged to permit the sheets to be pushed onto the pin, but oppose removal of a sheet, may be used. In some embodiments, a fastener that is configured to release the sheets in response to a projectile impact is used. In some embodiments, the sheets may be bonded or adhered to a substructure component (i.e. a spar, rib, or skin) in such a way that the sheet "peels" away and detaches from the substructure component when impact loaded. In other embodiments, sheets have one or more further attachment points spaced across them.

Figure 6:
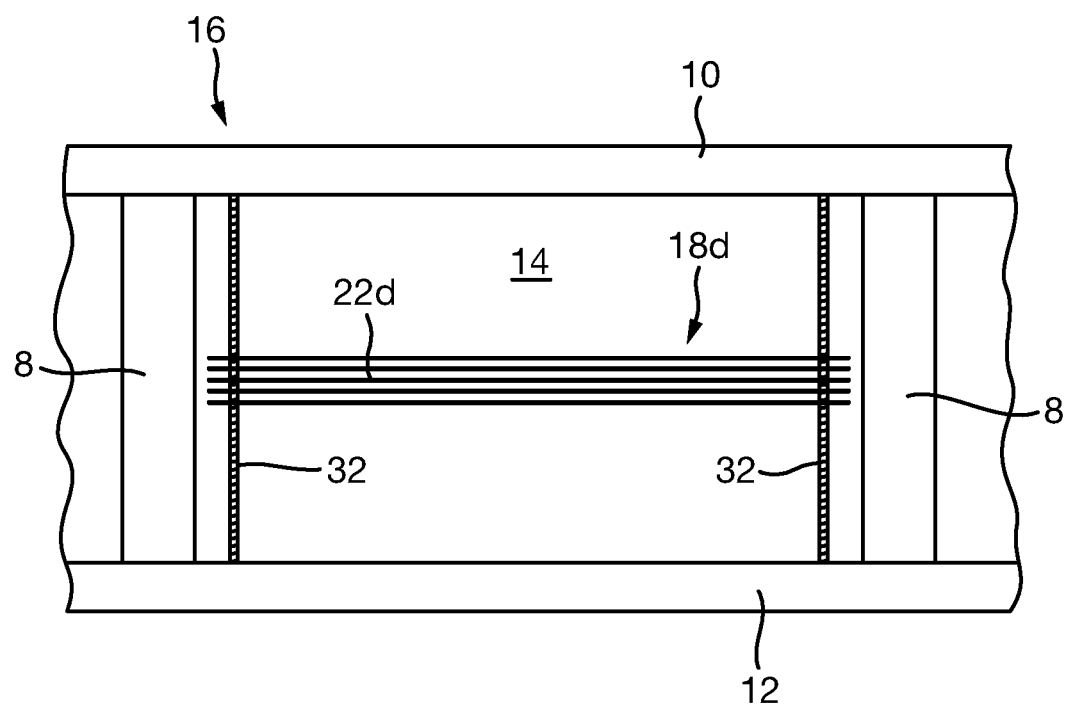
FIG. 6 is a schematic illustration (not to scale) showing a cross section through a fuel tank in which a second further embodiment of a hydrodynamic ram reducing assembly is implemented.

In the above embodiments, each assembly is attached to an internal surface of the fuel tank such that the sheets lie across and proximate to that internal surface. However, in other embodiments, one or more assemblies may be located at a different position within the fuel tank. For example, in some embodiments, an assembly may be located in a "mid-tank" position, for example, such that the sheets of the assembly are remote from the upper and lower skins, e.g. substantially equidistant from and parallel to the upper and lower skins. FIG. 6 is a schematic illustration (not to scale) showing a cross section through the fuel tank 16 in which a further embodiment of an assembly, hereinafter referred to as the "fourth assembly" 18*d* is implemented. The fourth assembly 18*d* comprises a plurality of sheets of material, hereinafter "fourth sheets" 22*d*, which are arranged as a stack and are located in the fuel tank substantially equidistant from and parallel to the upper and lower skins 10, 12. The fourth sheets 22*d* are loosely retained in position by threaded rods 32 extending between the upper and lower skin 10, 12. In some embodiments, the fourth sheets 22*d* may be directly attached to the spars 6 or ribs 8 e.g. using an adhesive.

In the above embodiments, an assembly includes a plurality of sheets of material. The sheets are fabric layers made of a ballistic fibre-based material, for example woven, crimped/stitched or a mat of fibres. However, in other embodiments, the sheets of material are made of different material to those described above and/or may have different dimensions to those provided above. In some embodiments, the term "sheet" refers to an article having a thickness that is much less than its length and width, for example a thickness that is at least 10 times smaller than its length and width, or a thickness that is at least 100 times smaller than its length and width, or a thickness that is at least 1000 times smaller than its length and width. The terminology "sheet" or "sheet of material" broadly refers any type of fabric, cloth, film, layer or sheet material and includes, but is not limited to, layers or material including elastic fabric materials (knitted, woven or non-woven), apertured plastic or non-plastic films, sheets of polymeric foam with open or closed cells, non-woven materials in general, breathable elastic materials in general, perforated or non-perforated breathable polyurethane sheet materials, extruded materials such as extruded films, and the like.

In some embodiments, one or more of the assemblies includes only a single sheet of material.

In the above embodiments, the sheets of material of an assembly are arranged as a stack, i.e. the sheets are layered one on top of another. In some embodiments, the stacked sheets may be substantially parallel or aligned. In some embodiments, for each sheet in a stack of sheets, an upper or lower surface of that sheet may be in contact with an upper or lower surface of an adjacent sheet in the stack. Thus, in some embodiments, if a stack of sheets includes three or more sheets, at least one sheet is sandwiched between two other sheets. However, in other embodiments, a sheet of material of an assembly is not in a stack of sheets. For example, in some embodiments, an assembly includes a sheet that has been folded one or more times to provide multiple (parallel) layers of the material. The sheets may be oriented within the fuel tank in any appropriate direction.

In the above embodiments, the sheets of material are flexible. For example, a sheet of material may be sufficiently flexible (i.e. have low stiffness) such that, when impacted by a projectile, that sheet of material deforms or bends to wrap around, at least to some extent, or wholly envelop, that projectile. However, in other embodiments, one or more of the sheet are not flexible, i.e. one or more of the sheets is rigid such that, when impacted by a projectile, that sheet does not wrap around the projectile to any extent. In some embodiments, the sheets of material are sufficiently flexible to inhibit undesirable transfer of structural loads into them, ensuring the aircraft structure operates as desired in terms of providing designed structural load paths.

What is claimed is:

1. A liquid storage system comprising:
   a tank for containing a liquid, said tank enclosing a liquid storage space;
   a non permeable envelope attached to an internal surface of the tank; and
   multiple layers of fabric enclosed in the non-permeable envelope, such that the multiple layers of fabric are isolated from a fluid in the tank, wherein a penetration force required to penetrate a layer of fabric is greater than a force with which the envelope attaches the multiple layers of fabric to the internal surface of the tank.

2. The liquid storage system according to claim 1, wherein the multiple layers of fabric comprises a plurality of fabric sheets arranged as a stack of sheets.

3. The liquid storage system according to claim 1, wherein the fabric comprises aramid or para-aramid fibres.

4. The liquid storage system according to claim 3, wherein the aramid or para-aramid fibres are poly-paraphenylene terephthalamide.

5. The liquid storage system according to claim 1, wherein each of the layers of fabric has a thickness of less than 0.5 mm.

6. The liquid storage system according to claim 1, wherein the multiple layers of fabric includes at least twenty layers.

7. The liquid storage system according to claim 1, wherein the envelope contains a fluid in addition to the multiple layers of fabric.

8. The liquid storage system according to claim 1, wherein a total cavity volume in the tank of the multiple layers of fabric and the non-permeable envelope is less than or equal to 15% by volume of the tank.

9. The liquid storage system according to claim 1, wherein the multiple layers of fabric are proximate to and substantially parallel with an internal surface of a wall of the tank.

10. A vehicle comprising a liquid storage system for containing a liquid, the liquid storage system being in accordance with claim 1.

11. A method of producing a liquid storage system, the method comprising:
    providing a tank for containing a liquid, said tank enclosing a liquid storage space;
    providing multiple layers of fabric;
    providing a non-permeable envelope;
    placing the multiple layers of fabric into the envelope;

sealing the envelope with the multiple layers of fabric located therein; and attaching the sealed envelope to an internal surface of the tank, wherein a penetration force required to penetrate a layer of fabric is greater than a force with which a non-permeable envelope attaches the multiple layers of fabric to the internal surface of the tank.

12. A liquid storage system comprising:

a tank for containing a liquid, said tank enclosing a liquid storage space;

multiple layers of fabric; and attachment means attaching the multiple layers of fabric to an internal surface of the tank; wherein the attachment means comprises one or more pins, each pin comprising a base portion for attachment to an internal surface of a wall of the tank, and a threaded elongate member passing through the multiple layers of fabric and wherein a penetration force required to penetrate a layer of fabric is greater than a force with which the attachment means attaches the multiple layers of fabric to the internal surface of the tank.

* * * * *